(12) United States Patent
Tang (10) Patent No.: US 11,297,655 B2
(45) Date of Patent: Apr. 5, 2022

(54) METHOD AND DEVICE FOR RANDOM ACCESS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/887,408

(22) Filed: May 29, 2020

(65) Prior Publication Data

US 2020/0296771 A1 Sep. 17, 2020

Related U.S. Application Data

(63) Continuation of application No. PCT/CN2017/114322, filed on Dec. 1, 2017.

(51) Int. Cl.
*H04W 74/08* (2009.01)
*H04W 74/00* (2009.01)
*H04W 68/02* (2009.01)

(52) U.S. Cl.
CPC ....... *H04W 74/0833* (2013.01); *H04W 68/02* (2013.01)

(58) Field of Classification Search
CPC ............. H04W 74/0833; H04W 68/02; H04W 74/006; H04W 74/002
USPC ....................................................... 370/328
See application file for complete search history.

(56) References Cited

U.S. PATENT DOCUMENTS

| 7,123,628 B1* | 10/2006 | Hwang | H04L 43/0823 370/469 |
| 2010/0002590 A1* | 1/2010 | Park | H04W 74/006 370/241 |
| 2010/0246499 A1* | 9/2010 | Kim | H04W 72/1289 370/329 |

(Continued)

FOREIGN PATENT DOCUMENTS

| CN | 102916767 A | 2/2013 |
| CN | 103220678 A | 7/2013 |

(Continued)

OTHER PUBLICATIONS

Sequans Communications: "Reduced RA for paged UEs", 3GPP DRAFT; R1-1720018 Reduced RA for Paged UEs, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 17, 2017 (Nov. 17, 2017), XP051368890, Retrieved from the Internet: URL: http://www.3gpp.org/ftp/tsg%5Fran/wG1%5FRL1/TSGR1%5F91/ Docs/ [retrieved on Nov. 17, 2017] *section 2*.
Supplementary European Search Report in the European application No. 17933693.7, dated Sep. 29, 2020.

(Continued)

*Primary Examiner* — Inder P Mehra (57) ABSTRACT

A method and device for random access method and device are provided. The method includes: User Equipment (UE) receives a paging message from a network; the UE determines random access control information associated with the paging message; the UE determines a random access resource according to the random access control information; and the UE initiates a random access procedure based on the random access resource.

8 Claims, 8 Drawing Sheets

1001
A network sends a paging message to UE

1002
The network receives information in a random access procedure initiated by the UE based on a random access resource, the random access resource is determined according to random access control information associated with the paging message

(56) References Cited

U.S. PATENT DOCUMENTS

| | | | |
|---|---|---|---|
| 2013/0225168 A1* | 8/2013 | Singh | H04W 36/00835 455/435.1 |
| 2016/0057738 A1 | 2/2016 | Lee et al. | |
| 2016/0374048 A1* | 12/2016 | Griot | H04W 68/005 |
| 2019/0124650 A1* | 4/2019 | Sun | H04W 72/0446 |

FOREIGN PATENT DOCUMENTS

| | | | |
|---|---|---|---|
| CN | 107005966 A | 8/2017 | |
| WO | 2011160547 A1 | 12/2011 | |
| WO | 2014181981 A1 | 11/2014 | |

OTHER PUBLICATIONS

Written Opinion of the International Search Authority in the international application No. PCT/CN2017/114322, dated Aug. 7, 2018.

First Office Action of the Chinese application No. 201780097261.1, dated May 28, 2021.

First Office Action of the European application No. 17933698.7, dated Apr. 8, 2021.

Ericsson:"Paging procedure clarifications", 3GPP DRAFT• R2-085273 3rd Generation Partnership Project (3GPP), Mobile Competence Centre ; 650, Route Des Lucioles • F-06921 Sophia-Antipolis Cedex •France No. Prague, Czech Republic; Sep. 22, 2008, Sep. 22, 2008 (Sep. 22, 2008), XP050320167,[retrieved on Sep. 22, 2008].

Second Office Action of the European application No. 17933698.7, dated Sep. 14, 2021.

Office Action of the Indian application No. 202027027575, dated Nov. 9, 2021.

Mediatek Inc. Remaining Issues for Random Access Transmission. 3GPP TSG-RAN WG1 Meeting #83, R1-157385 Nov. 22, 2015(Nov. 22, 2015), entire document.

International Search Report in the international application No. PCT/CN2017/114322, dated Aug. 7, 2018.

\* cited by examiner

FIG. 1

| PSS | PBCH | SSS | PBCH |

PSS  SSS  PBCH

Frequency division is implemented for a time-domain resource of PO and a time-frequency resource of a nominal resource A time-domain resource of PO includes a time-frequency resource of a nominal resource

METHOD AND DEVICE FOR RANDOM ACCESS

CROSS-REFERENCE TO RELATED APPLICATIONS

The application is a continuation application of PCT Application No. PCT/CN2017/114322 filed on Dec. 1, 2017, the disclosure of which is incorporated by reference herein in its entity.

BACKGROUND

In a Long Term Evolution (LTE) system, a network may initiate a paging procedure to User Equipment (UE) in an idle state and UE in a connection state. The UE receives a paging message in a paging time unit of a Paging Frame (PF) during a Discontinuous Reception (DRX) cycle.

UE determines, according to a UE identifier (UE_ID) of the UE, a position of a paging time unit for the UE during a DRX cycle and then receives a paging message. UE_IDs are uniformly distributed in different paging time units. In some scenarios, the numbers of UE_IDs distributed in some paging time units are required to be increased, so that more UEs may be paged in these paging time units. However, when an excessively large number of UEs are paged in a paging time unit, this will result in that many UE may, after receiving paging messages, initiate random access procedures to the network. Due to limited random access resources, a large number of random access procedures may cause network congestion.

SUMMARY

The disclosure relates to the field of wireless communication technologies. Embodiments of the disclosure provide a method and device for random access.

In a first aspect, the embodiments of the disclosure provide a method for random access, which may include the following operations.

UE receives a paging message from a network.

The UE determines random access control information associated with the paging message.

The UE determines a random access resource according to the random access control information.

The UE initiates a random access procedure based on the random access resource.

In a second aspect, the embodiments of the disclosure provide a method for random access, which may include the following operations.

A network sends a paging message to UE.

The network receives information in a random access procedure initiated by the UE based on a random access resource, here, the random access resource is determined according to random access control information associated with the paging message.

In a third aspect, the embodiments of the disclosure provide a device for random access, which may be performed by UE and may include a processor, a sender and a receiver.

The receiver may be configured to receive a paging message from a network.

The processor may be configured to determine random access control information associated with the paging message.

The processor may be further configured to determine a random access resource according to the random access control information.

The sender may be configured to initiate a random access procedure based on the random access resource.

In a fourth aspect, the embodiments of the disclosure provide a device for random access, which may be performed by a network and may include a sender and a receiver.

The sender may be configured to send a paging message to UE.

The receiver may be configured to receive information in a random access procedure initiated by the UE based on a random access resource, here, the random access resource is determined according to random access control information associated with the paging message.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

For making the technical solutions of the embodiments of the disclosure convenient to understand, key technologies involved in the embodiments of the disclosure will be explained and described below.

1) Beam in 5th Generation (5G)

Figure 1:
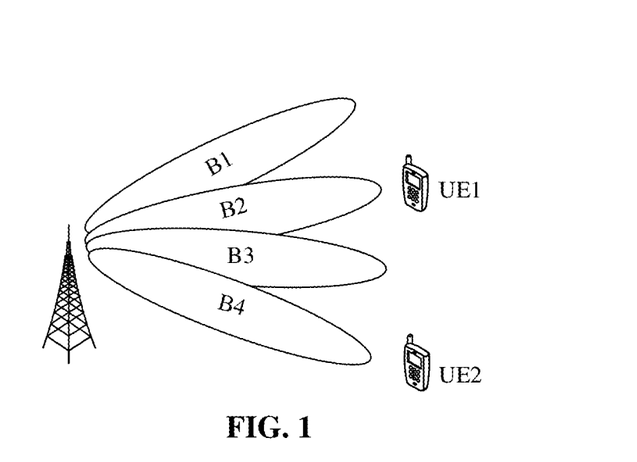
FIG. 1 is a diagram of sending a wireless signal by a base station through a beam.

Since a band adopted for a 5G system is higher than that for an LTE system, path loss of wireless signal transmission of the 5G system is greater than that of the LTE system, resulting in a smaller coverage of a wireless signal of the 5G system. Therefore, in the 5G system, a beamforming technology is adopted to form a beam through a multi-antenna system of a base station to increase a gain of the wireless signal to compensate for the path loss. In the beamforming technology, a beam is directional, and a narrow beam may not cover all regions of a cell but only cover part of regions of the cell. As illustrated in FIG. 1, the base station may send signals through four beams (B1, B2, B3 and B4) of different directions. The beam B2 may not cover UE2 but only cover UE1.

2) Synchronization Signal Block (SS Block) in 5G

Figure 2:
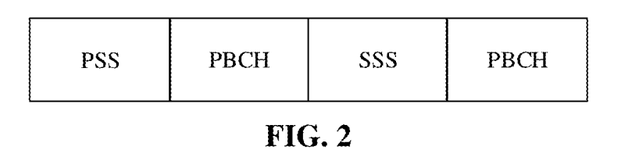
FIG. 2 is a diagram of a Synchronization Signal (SS) block.

A common channel and common signal, for example, a broadcast channel and an SS, in the 5G system are required to cover a whole cell in a multi-beam sweeping manner such that UE in the cell may receive these signals. Multi-beam transmission of synchronization signals (SS) is implemented by defining an SS burst set. One SS burst set includes one or more SS bursts, and one SS burst includes one or more SS blocks (which may also be called SSB for short). One SS block carries an SS and broadcast channel of one beam. Therefore, one SS burst set may include SSs of beams that are of a same number as SS blocks in the cell. As illustrated in FIG. 2, an SS block includes one symbol for a Primary Synchronization Signal (PSS), one symbol for a Secondary Synchronization Signal (SSS) and two symbols for Physical Broadcast Channels (PBCHs).

The number L of SS blocks in an SS burst set is determined according to a band of the system. For example:

for a band of 3 GHz, L is 4;

for a band of 3 GHz-6 GHz, L is 8; and for a band of 6 GHz-52.6 GHz, L is 64.

Figure 3:
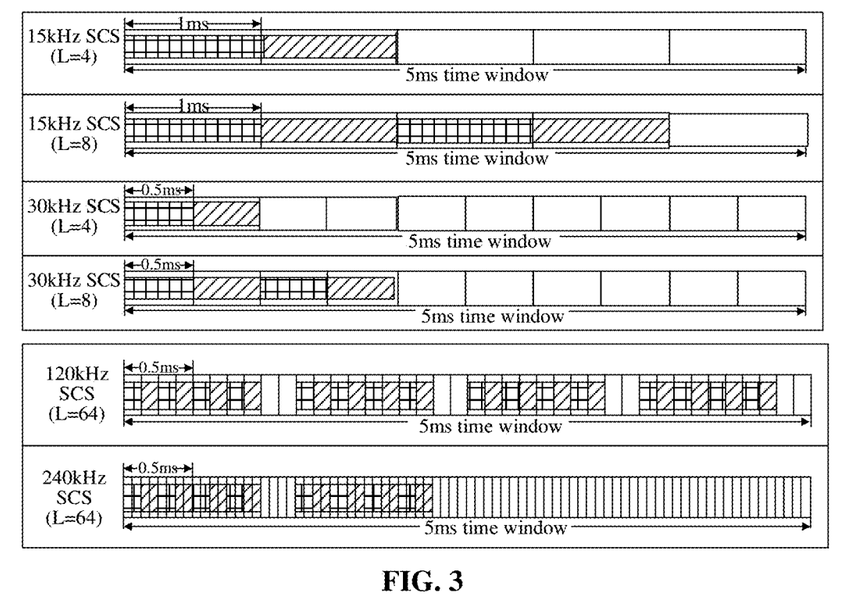
FIG. 3 is a diagram of slot distributions under different Subcarrier Spacings (SCSs) and bands.

For an SS burst set, a transmission cycle thereof may be configured, and in an example, an SS burst set in a cycle is transmitted in a 5 ms time window. In addition, an SCS of the system may also be configured, and slot distributions under different SCSs and bands are illustrated in FIG. 3. FIG. 3 illustrates, from top to bottom:

a slot distribution of the SS burst set under a 15 KHz SCS and L=4 (corresponding to the band of 3 GHz);

a slot distribution of the SS burst set under the 15 KHz SCS and L=8 (corresponding to the band of 3 GHz-6 GHz);

a slot distribution of the SS burst set under a 30 KHz SCS and L=4 (corresponding to the band of 3 GHz);

a slot distribution of the SS burst set under the 30 KHz SCS and L=8 (corresponding to the band of 3 GHz-6 GHz);

a slot distribution of the SS burst set under a 120 KHz SCS and L=64 (corresponding to the band of 6 GHz-52.6 GHz); and a slot distribution of the SS burst set under a 240 KHz SCS and L=64 (corresponding to the band of 6 GHz-52.6 GHz).

Figure 4:
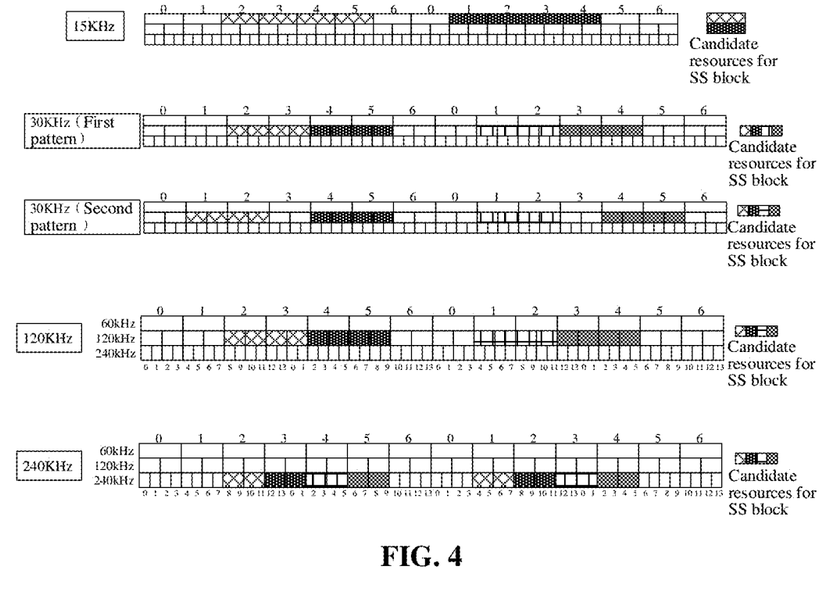
FIG. 4 is a diagram of distributions of SS blocks under different SCSs.

Furthermore, for a distribution of SS blocks in one slot, one slot includes 14 symbols and may carry at most two SS blocks. Distributions of SS blocks under different SCSs are illustrated in FIG. 4. FIG. 4 illustrates, from top to bottom:

a distribution of SS blocks in one slot under a 15 KHz SCS;

a first distribution of SS blocks in one slot under a 30 KHz SCS;

a second distribution of SS blocks in one slot under the 30 KHz SCS;

a distribution of SS blocks in one slot under a 120 KHz SCS; and a distribution of SS blocks in one slot under a 240 KHz SCS.

In the solution, although the number L of the SS blocks is determined according to the frequency range of the system, L is only a maximum number of the SS blocks, and the number of SS blocks practically transmitted by a network may be less than L. The number of the SS blocks practically transmitted by the network is required to be indicated to UE to perform rate matching. A time-frequency resource location where no SS block is transmitted may be configured to transmit another channel, for example, a Physical Downlink Shared Channel (PDSCH). Herein, information of the SS blocks practically transmitted by the network is indicated through Remaining Minimum System Information (RMSI).

Figure 5:
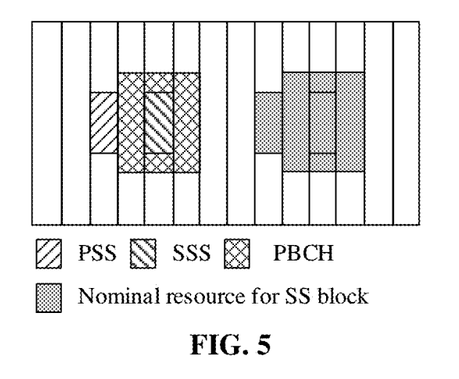
FIG. 5 is a diagram of a location distribution of predefined time-frequency resources where SS blocks are located in a slot.

Locations of predefined time-frequency resources where SS blocks are located are illustrated in FIG. 5. However, due to different cycles of the SS blocks and different SS blocks that are practically transmitted, there are not always SS blocks transmitted on the predefined time-frequency resources, and thus these predefined time-frequency resources are called nominal resources of the SS blocks.

3) Paging in LTE

In an LTE system, a network may initiate a paging procedure to UE in an idle state and UE in a connection state. The paging procedure may be triggered by a core network or triggered by a base station to send a paging request to the UE in the idle state, notify the UE of a system information update or inform the UE to receive Earthquake and Tsunami Warning System (ETWS) information and Commercial Mobile Alert Service (CMAS) information, etc. The base station, after receiving paging messages from the core network, parses the paging messages to obtain a Tracking Area (TA) list of the UE and performs air interface paging on cells of TAs in the TA list. Furthermore, the base station, after receiving the paging messages from the core network, aggregates the paging messages corresponding to the same PO into one paging message for transmission to the related UE through a paging channel. The UE receives a paging parameter through a system message, calculates the PO based on the paging parameter in combination with its own International Mobile Subscriber Identification Number (IMSI), and receives the paging message in a time range corresponding to the PO. Herein, the paging message is carried through a PDSCH. The UE obtains paging instruction information by detecting a Physical Downlink Control Channel (PDCCH) scrambled with a Paging Radio Network Temporary Identity (P-RNTI), and receives the paging message in the PDSCH. Furthermore, the UE in the idle state may save power in a DRX manner, and the UE acquires DRX related information from a System Information Block 2 (SIB2) and monitors, in a PO of a PF in a DRX cycle, the PDCCH scrambled with the P-RNTI to receive the paging message.

Figure 6:
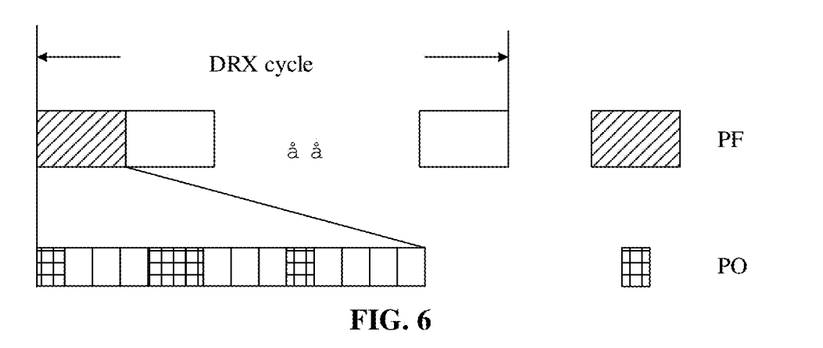
FIG. 6 is a distribution diagram of a PF and a Paging Occasion (PO).

In the solution, the PF represents a specific System Frame Number (SFN) where the paging message should appear, and the PO represents subframe(s) in which the paging message may appear. A PF may include one or more PO subframes, and in each DRX cycle or paging cycle, the UE is only required to monitor the PO subframe(s) for the UE itself. A distribution of a PF and a PO is illustrated in FIG. 6. A radio frame with a SFN that meets the following formula may be determined as a PF.

$$SFN \bmod T = (T \operatorname{div} N)^*(UE\_ID \bmod N).$$

T represents the DRX cycle of or the paging cycle of the UE. In a case that a default paging cycle carried in the SIB2 is represented as T_sib, if a DRX value T_ue of the UE has been configured, then T=min(T_ue, T_sib), which means that T is equal to a minimum value between T_ue and T_sib; if T_ue is not configured, then T=T_sib. UE_ID=(IMSI mode 1024), namely all IMSIs are divided into 1,024 groups, and the IMSI is unique for each UE. N=min(T, nB), which means that N is equal to a minimum value between T and nB, where the parameter nB represents a paging density, nB is carried in the SIB2 and a value range thereof is {4T, 2T, T, T/2, T/4, T/8, T/16, T/32}, and therefore a value range of N is {T, T/2, T/4, T/8, T/16, T/32}. N practically represents the number of PFs in each cycle.

The location of the PO subframe is determined based on a type of LTE standard (Frequency Division Duplex (FDD) or Time Division Duplex (TDD)) and the parameters Ns and i_s. Herein, Ns represents the number of PO subframes in each PF, i_s represents an index of the PO subframe, Ns=max(1, nB/T) and i_s=floor(UE_ID/N) mod Ns. As illustrated in Table 1 and Table 2, only three values 1, 2 and 4 are adopted for Ns. For example, in a case that an LTE-FDD system is adopted at present and Ns=4, if i_s=0, then PO=0 and the paging message may be transmitted in the 0 #subframe; if i_s=2, then PO=5 and the paging message may be transmitted in the 5 #subframe. Finally, the UE determines the location of the PO for the UE itself in a cycle according to POs in the cell and the UE_ID of the UE. By this method, UEs are averagely divided to different POs.

TABLE 1

| (FDD) | | | | |
|---|---|---|---|---|
| Ns | PO (i_s = 0) | PO (i_s = 1) | PO (i_s = 2) | PO (i_s = 3) |
| 1 | 9 | N/A | N/A | N/A |
| 2 | 4 | 9 | N/A | N/A |
| 4 | 0 | 4 | 5 | 9 |

TABLE 2

| (TDD) | | | | |
|---|---|---|---|---|
| Ns | PO (i_s = 0) | PO (i_s = 1) | PO (i_s = 2) | PO (i_s = 3) |
| 1 | 0 | N/A | N/A | N/A |
| 2 | 0 | 5 | N/A | N/A |
| 4 | 0 | 1 | 5 | 6 |

4) Paging in 5G

Figure 7:
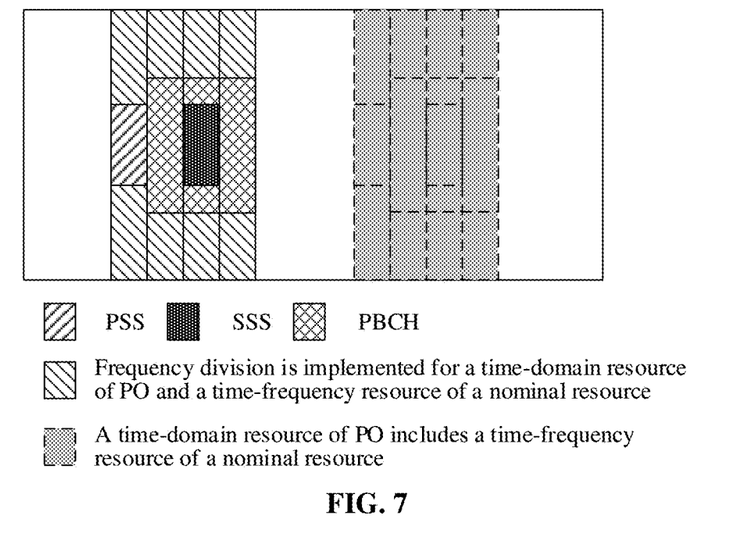
FIG. 7 is a distribution diagram of time-frequency resources of a PO.

For definitions about time-frequency resources of a PO in 5G, one definition is to define a nominal resource corresponding to an SS block as a time-frequency resource for carrying a paging message in the PO. As illustrated in FIG. 7, on symbols where a nominal resource on which an SS block is actually transmitted is located, frequency division is implemented for a time-frequency resource corresponding to a PO and a time-frequency resource corresponding to the nominal resource, and such a type of the time-frequency resource corresponding to the PO is called a first time-frequency resource type; and on symbols where a nominal resource on which no SS block is transmitted is located, a time-frequency resource corresponding to the PO may include a time-frequency resource corresponding to the nominal resource, and such a type of time-frequency resource corresponding to the PO is called a second time-frequency resource type.

For the two types of time-frequency resources of the PO in FIG. 7, their capabilities of carrying paging message are also different due to different time-frequency resource sizes. Particularly, for the first time-frequency resource type, since frequency division is implemented for the time-frequency resource corresponding to the PO and the time-frequency resource corresponding to the nominal resource, and in addition, a total bandwidth is required to meet a minimum bandwidth capability of UE, a bandwidth for carrying a paging message is quite limited. Meanwhile, the paging message is transmitted in a beam sweeping manner, the overhead is very large. One way to save overhead is to increase the number of UEs that may be paged in each PO, thereby reducing the total number of times for which the paging message is transmitted. For POs adopting the two types of time-frequency resources, due to different resource sizes, different paging capabilities may be adopted, while in LTE, all UEs (corresponding to UE_IDs) are uniformly divided among POs.

For example, in LTE, UE_ID=(IMSI mod 1024), that is, all IMSIs are divided into 1,024 UE groups, wherein UEs in each UE group correspond to the same UE_ID. POs where different UE_IDs are located are calculated according to a formula i_s=floor(UE_ID/N) mod Ns, namely PO=f (UE_ID, N, Ns). In LTE, UE_IDs are uniformly distributed in different POs. For example, if nB=32, namely there are 32 POs in a DRX cycle, there are 1,024/32=32 UE_IDs in each PO.

In the embodiments of the disclosure, UE_IDs may be unequally distributed in POs, relatively more UE_IDs may be distributed in some POs, and relatively fewer UE_IDs may be distributed in other POs. When the number of UE_IDs distributed in a PO is increased, the number of UEs paged in the PO may be increased. When a network initiates a paging procedure to UE, the UE receives a paging message and finds that the UE itself is paged, then the UE may initiate a random access procedure to the network and establish a Radio Resource Control (RRC) connection with the network. Due to increase of the numbers of UEs that may be paged in some POs, many UEs may consequently initiate random access procedures, and the network may be congested under limited random access resources. Particularly in 5G, a random access resource is associated with an SS block, namely an SS block transmitted through beam(s) is bound with a group of random access resources, UE initiates a random access procedure based on the random access resources, and the network receives, through a receiving beam, information in random access procedure initiated on the random access resources. It can be seen that each SS block is associated with limited random access resources.

For solving the problem of network congestion caused by paging, the following solutions are proposed in the embodiments of the disclosure.

Figure 8:
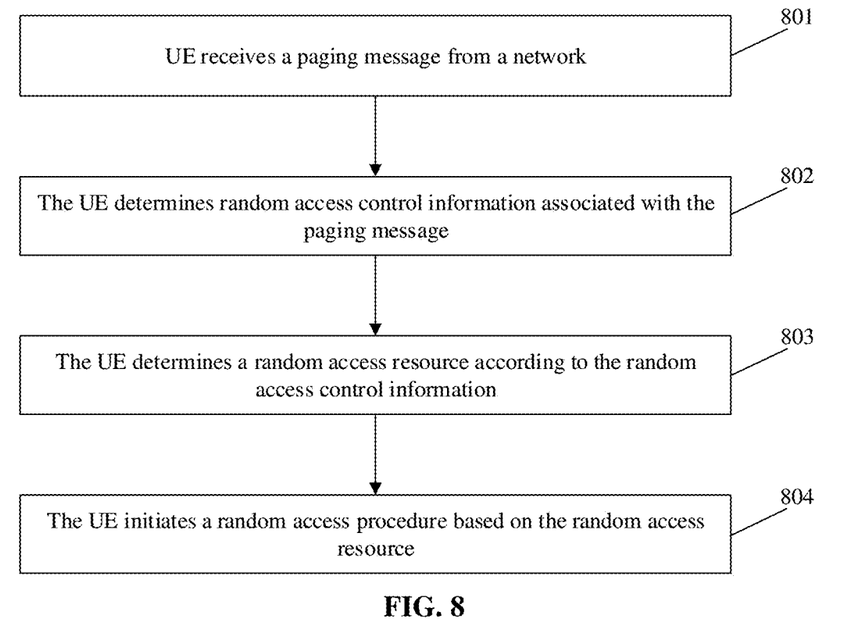
FIG. 8 is a first flowchart of a method for random access according to an embodiment of the disclosure.

FIG. 8 is a first flowchart of a method for random access according to an embodiment of the disclosure. As illustrated in FIG. 8, the method for random access includes the following operations.

In 801, UE receives a paging message from a network.

In 802, the UE determines random access control information associated with the paging message.

Herein, the random access control information is configured to indicate to the UE a random access resource for initiating the random access procedure. Different UEs may correspond to different random access resources.

In an implementation mode, an implementation manner for the random access control information may include, but not limited to, the following two manners.

A first manner: the UE acquires the random access control information from the paging message.

Specifically, the paging message carries UE information, and the UE information at least includes a UE Identifier (ID) and random access control information.

Correspondingly, the UE, after receiving the paging message, judges whether the UE ID in the paging message matches with its own UE ID, and if the UE ID in the paging message matches its own UE ID, the UE extracts the random access control information from the paging message.

A second manner: the UE determines the random access control information according to a predefined rule.

In an implementation mode, the UE determines the random access control information according to a UE ID of the UE.

In another implementation mode, the UE determines the random access control information according to a position of a UE ID of the UE in the paging message.

In 803, the UE determines a random access resource according to the random access control information.

In the embodiment of the disclosure, the random access control information includes at least one of: random access priority information, random access resource information, or random access time information.

For example, the random access control information includes the random access priority information, and different random access priorities correspond to different random access resources. There is made such as hypothesis that the UE receives the paging message in a subframe n, the UE determines, based on the random access priority, that the random access resource is a subframe n+k, where k is a positive integer. Herein, if the random access priority is lower, a value of the k is greater.

For example, the random access control information includes the random access resource information, and the random access resource information includes time-frequency resource information, or includes preamble index information.

For example, the random access control information includes the random access time information, and the random access time information includes a random access occasion, starting time and the like.

The first manner in 802 that the UE acquires the random access control information from the paging message is described in a following example.

For example, in an LTE system, a paging message carries a Serving-Temporary Mobile Subscriber Identity (S-TMSI) of a paged UE, the S-TMSI has 40 bits. The UE receives, in a PO for the UE, the paging message, and judges whether the paging message carries an S-TMSI of the UE itself or not. If the paging message carries the S-TMSI of the UE itself, the UE determines that the UE itself is paged. Based on this, information of 1-bit is added to the end of the S-TMSI and is used for identifying a random access priority corresponding to the UE paged. For example, in a case that a value of the 1-bit is 1, which represents a high priority, the UE receives the paging message in a subframe n and sends a random access preamble in a first subframe n+k1 with an available Random Access Channel (RACH) resource; in a case that the value of the 1-bit is 0, which represents a low priority, the UE receives the paging message in the subframe n and sends the random access preamble in a first subframe n+k2 with an available RACH resource, where k1≥6 and k2≥10.

In the example, the random access priority is represented with a bit. Those skilled in the art should know that the random access priority may also be represented with more bits to achieve more random access priorities. In addition, the example is made for the LTE system, and the technical solution of the embodiment of the disclosure may be applied to communication systems of more other types, for example, a 5G system.

The second manner in 802 that the UE determines the random access control information according to the predefined rule is described in following examples.

1) The UE determines the random access control information according to the UE ID of the UE.

Specifically, the UE receives the paging message in the subframe n and calculates the random access control information according to the UE ID of the UE. The UE determines based on the random access control information that the random access resource is the subframe n+k, where k is a positive integer. Different random access control information may correspond to different k values.

For example, in the LTE, the paged UE determines the random access control information according to the S-TMSI of the paged UE itself. For example, under the condition of S-TMSI mod 2=0, the UE receives the paging message in the subframe n and sends the random access preamble in the first subframe n+k1 with the available RACH resource; under the condition of S-TMSI mod 2=1, the UE receives the paging message in the subframe n and sends the random access preamble in the first subframe n+k2 with the available RACH resource, where k1≥6 and k2≥10.

2) The UE determines the random access control information according to the position of the UE ID of the UE in the paging message.

Specifically, the UE receives the paging message in the subframe n and calculates the random access control information according to the position of its own UE ID in the paging message. The UE determines based on the random access control information that the random access resource is the subframe n+k, where k is a positive integer. Different random access control information may correspond to different k values.

In 804, the UE initiates a random access procedure based on the random access resource.

According to the technical solution of the embodiment of the disclosure, congestion caused by random access procedures initiated by the paged UEs on limited random access resources is avoided while increasing the number of UEs simultaneously paged in a PO, so that an access delay is reduced, and a resource overhead brought by paging re-initiation of the network is avoided.

Figure 9:
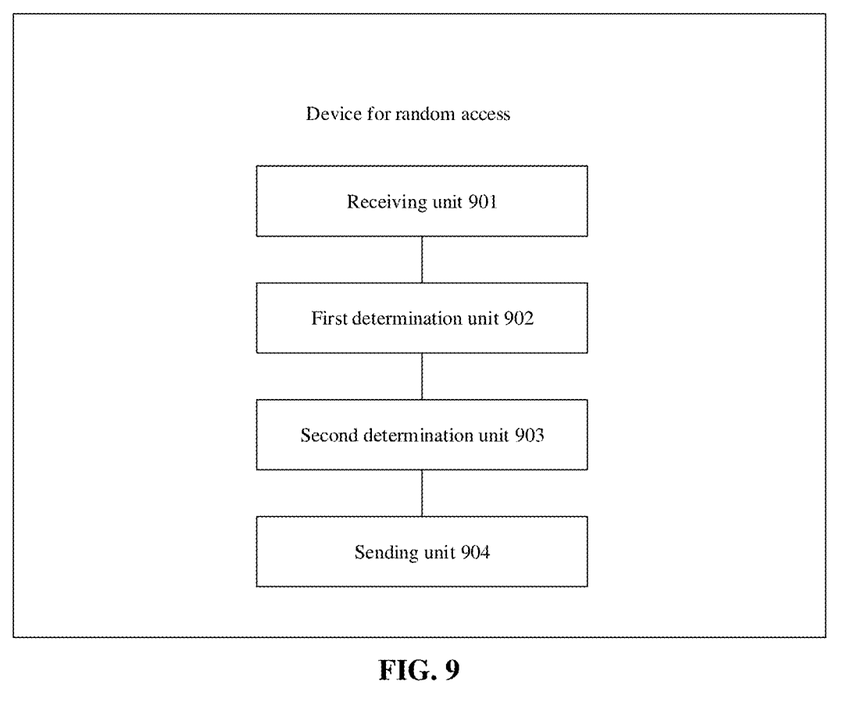
FIG. 9 is a first structure composition diagram of a device for random access according to an embodiment of the disclosure.

FIG. 9 is a first structure composition diagram of a device for random access according to an embodiment of the disclosure. As illustrated in FIG. 9, the device for random access includes a receiving unit 901, a first determination unit 902, a second determination unit 903 and a sending unit 904.

The receiving unit 901 is configured to receive a paging message sent by a network.

The first determination unit 902 is configured to determine random access control information associated with the paging message.

The second determination unit 903 is configured to determine a random access resource according to the random access control information.

The sending unit 904 is configured to initiate a random access procedure based on the random access resource.

In an implementation mode, the first determination unit 902 is configured to acquire the random access control information from the paging message.

In an implementation mode, the first determination unit 902 is configured to determine the random access control information according to a predefined rule.

In an implementation mode, the paging message contains UE information, and the UE information at least includes a UE ID of a UE and the random access control information.

In an implementation mode, the first determination unit 902 is configured to determine the random access control information according to a UE ID of a UE.

In an implementation mode, the first determination unit 902 is configured to determine the random access control information according to a position of a UE ID of a UE in the paging message.

In an implementation mode, the random access control information includes at least one of: random access priority information, random access resource information, or random access time information.

Those skilled in the art should know that functions realized by each unit in the device for random access illustrated in FIG. 9 may be understood with reference to related descriptions about the method for random access. The functions of each unit in the device for random access illustrated in FIG. 9 may be realized through a program run on a processor, and may also be realized through a specific logical circuit.

Figure 10:
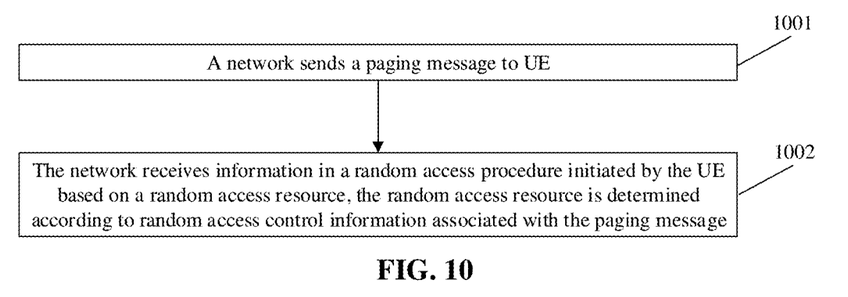
FIG. 10 is a second flowchart of a method for random access according to an embodiment of the disclosure.

FIG. 10 is a second flowchart of a method for random access according to an embodiment of the disclosure. As illustrated in FIG. 10, the method for random access includes the following operations.

In 1001, a network sends a paging message to UE.

In 1002, the network receives information in a random access procedure initiated by the UE based on a random access resource, here, the random access resource is determined according to random access control information associated with the paging message.

In an implementation mode, the network indicates the random access control information in the paging message.

Specifically, 1) the network carries UE information in the paging message, here, the UE information at least includes a UE ID of the UE and the random access control information. 2) The network indicates, in the paging message, the random access control information based on a position of a UE ID of the UE in the paging message.

In another implementation mode, the random access control information is determined according to a predefined rule.

Specifically, the predefined rule includes that the random access control information is determined according to a UE ID of the UE.

In the embodiment of the disclosure, the random access control information includes at least one of: random access priority information, random access resource information, or random access time information.

Figure 11:
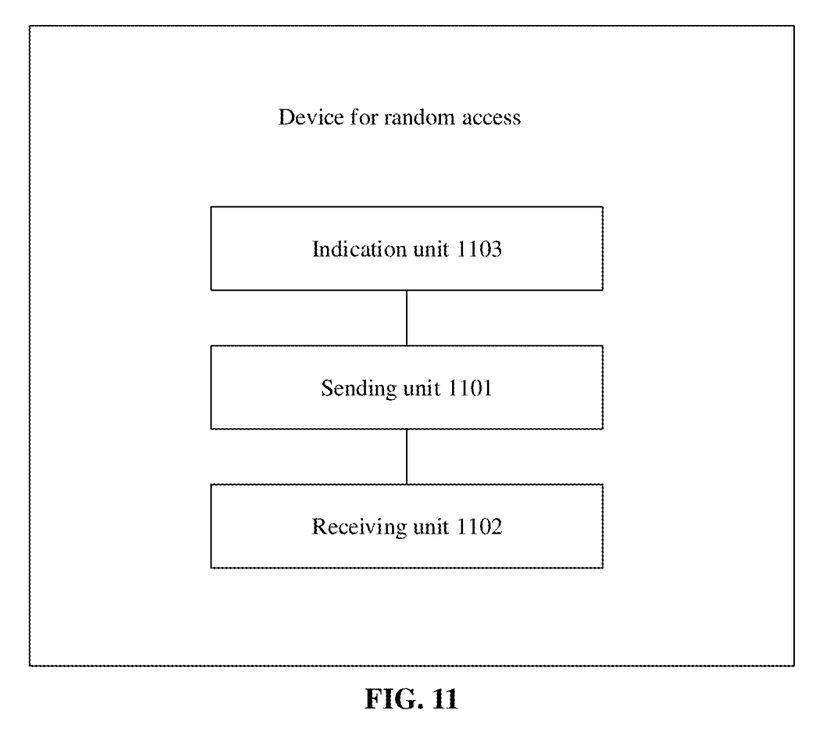
FIG. 11 is a second structure composition diagram of a device for random access according to an embodiment of the disclosure.

FIG. 11 is a second structure composition diagram of a device for random access according to an embodiment of the disclosure. As illustrated in FIG. 11, the device for random access includes a sending unit 1101 and a receiving unit 1102.

The sending unit 1101 is configured to send a paging message to UE.

The receiving unit 1102 is configured to receive information in a random access procedure initiated by the UE based on a random access resource, here, the random access resource is determined according to random access control information associated with the paging message.

In an implementation mode, the device further includes an indication unit 1103.

The indication unit 1103 is configured to indicate the random access control information in the paging message.

In an implementation mode, the random access control information is determined according to a predefined rule.

In an implementation mode, the indication unit 1103 is configured to carry UE information in the paging message, here, the UE information at least includes a UE ID of the UE and the random access control information.

In an implementation mode, the predefined rule includes the following operation.

The random access control information is determined according to a UE ID of the UE.

In an implementation mode, the indication unit 1103 is configured to indicate, in the paging message, the random access control information based on a position of a UE ID of the UE in the paging message.

In an implementation mode, the random access control information includes at least one of: random access priority information, random access resource information, or random access time information.

When being implemented in form of software functional module and sold or used as an independent product, the device for random access of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes, such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, having stored thereon a computer-executable instruction that, when executed by a processor, cause the processor to implement the method for random access of the embodiments of the disclosure.

Figure 12:
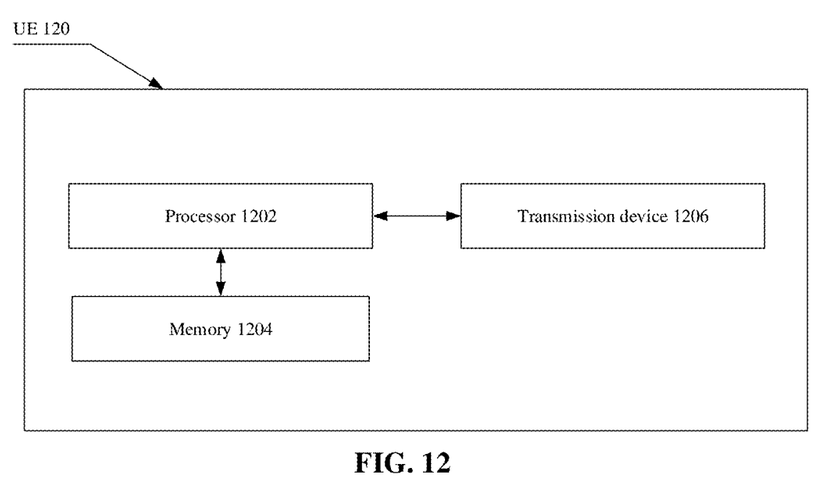
FIG. 12 is a structure composition diagram of UE according to an embodiment of the disclosure.

FIG. 12 is a structure composition diagram of UE according to an embodiment of the disclosure. As illustrated in FIG. 12, the UE 120 may include one or more (only one is illustrated in the figure) processors 1202 (the processor 1202 may include, but not limited to, a processing device such as a Micro Controller Unit (MCU) or a Field Programmable Gate Array (FPGA)), a memory 1204 configured to store data and a transmission device 1206 configured for a communication function. Those of ordinary skill in the art should know that the structure illustrated in FIG. 12 is only schematic and not intended to limit the structure of the electronic device. For example, the UE 120 may further include components more or fewer than the components illustrated in FIG. 12 or has a configuration different from that illustrated in FIG. 12.

The memory 1204 may be configured to store a software program of application software and a module, for example, a program instruction/module corresponding to the methods for random access in the embodiments of the disclosure. The processor 1202 runs the software program and module stored in the memory 1204, to execute various functional applications and data processing, namely implementing the abovementioned methods for random access. The memory 1204 may include a high-speed random access memory and may also include a nonvolatile memory, for example, one or more magnetic storage devices, flash memories or other nonvolatile solid-state memories. In some examples, the memory 1204 may further include a memory arranged remotely relative to the processor 1202 and the remote memory may be connected to the UE 120 through a network. An example of the network includes, but not limited to, the Internet, an intranet, a local area network, a mobile communication network and a combination thereof.

The transmission device 1206 is configured to receive or send data through a network. A specific example of the network may include a wireless network provided by a communication provider of the UE 120. In an example, the transmission device 1206 includes a Network Interface Controller (NIC), which may be connected with another network device through a base station, thereby communicating with the Internet. In an example, the transmission device 1206 may be a Radio Frequency (RF) module, configured to communicate with the Internet in a wireless manner.

The technical solutions in the embodiments of the disclosure may be freely combined without conflicts.

In some embodiments provided by the disclosure, it is to be understood that the disclosed methods and intelligent devices may be implemented in another manner. The device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection of the devices or the units through some interfaces, and may be electrical, mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit, or two or more than two units may also be integrated into a unit. The integrated unit may be implemented in a hardware form and may also be implemented in form of hardware and software functional unit.

The above is only the specific implementation modes of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for random access, comprising:
  receiving, by User Equipment (UE), a paging message from a network, wherein the paging message carries UE information which at least comprises a UE Identifier (ID) and random access control information, and the random access control information comprises random access priority information, wherein the random access priority information is represented by one bit for identifying a random access priority corresponding to a paged UE;
  determining, by the UE, whether the UE ID in the paging message matches a UE ID of the UE;
  in response to determining that the UE ID in the paging message matches the UE ID of the UE, acquiring, by the UE, the random access control information from the paging message;
  determining, by the UE, a random access resource according to the random access control information; and
  initiating, by the UE, a random access procedure based on the random access resource.

2. The method of claim 1, wherein the random access control information further comprises at least one of: random access resource information, or random access time information.

3. A method for random access, comprising:
  carrying, by a network, User Equipment (UE) information in a paging message, wherein the UE information at least comprises a UE Identifier (ID) and random access control information, and the random access control information comprises random access priority, information, wherein the random access priority information is represented by one bit for identifying a random access priority corresponding to a paged UE;
  sending, by the network, the paging message to the UE, wherein the paging message is configured to instruct the UE to determine whether the UE ID in the paging message matches a UE ID of the UE, acquire, in response to determining that the UE ID in the paging message matches the UE ID of the UE, the random access control information from the paging message, and determine a random access resource according to the random access control information; and
  receiving, by the network, information in a random access procedure initiated by the UE based on the random access resource.

4. The method of claim 3, wherein the random access control information further comprises at least one of: random access resource information, or random access time information.

5. A device for random access, for use in User Equipment (UE), comprising:
  a receiver, configured to receive a paging message from a network, wherein the paging message carries UE information which at least comprises a UE identifier (ID) and random access control information, and the random access control information comprises random access priority information, wherein the random access priority information is represented by one bit for identifying a random access priority corresponding to a paged UE;
  a processor, configured to: determine whether the UE ID in the paging, message matches a UE ID of the UE;
  in response to determining that the UE ID in the paging message matches the UE ID of the UE, acquire the random access control information from the paging message; and
  determine a random access resource according to the random access control information; and
  a sender, configured to initiate a random access procedure based on the random access resource.

6. The device of claim 5, wherein the random access control information further comprises at least one of: random access resource information, or random access time information.

7. A device for random access, for use in a network, comprising:
  a processor, configured to carry User Equipment (UE) information in a paging message, wherein the UE information at least comprises a UE Identifier (ID) and random access control information, and the random access control information comprises random access priority information, wherein the random access priority information is represented by one bit for identifying a random access priority corresponding to a paged UE;

a sender, configured to send the paging message to the-UE, wherein the paging message is configured to instruct the UE to determine whether the UE ID in the paging message matches a UE ID of the UE, acquire, in response to determining that the UE ID in the paging message matches the UE ID of the UE, the random access control information from the paging message, and determine a random access resource according to the random access control information; and a receiver, configured to receive information in a random access procedure initiated by the UE based on the random access resource.

8. The device of claim 7, wherein the random access control information further comprises at least one of: random access resource information, or random access time information.

* * * * *